Oct. 24, 1933.  M. P. H. L. RAEPSAET  1,931,964
PROCESS FOR THE MANUFACTURE OF BANDS OF CELLULAR RUBBER WITH CLOSED CELLS
Filed Aug. 24, 1931
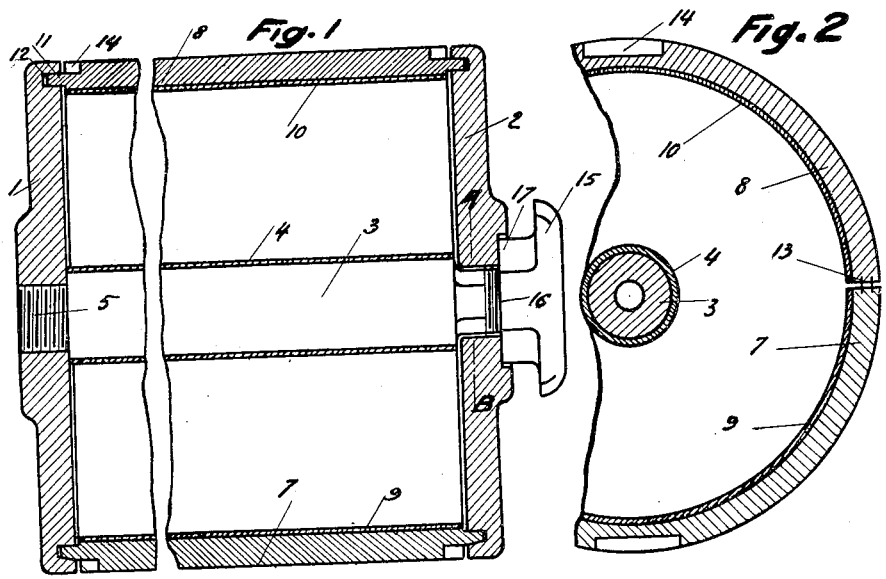
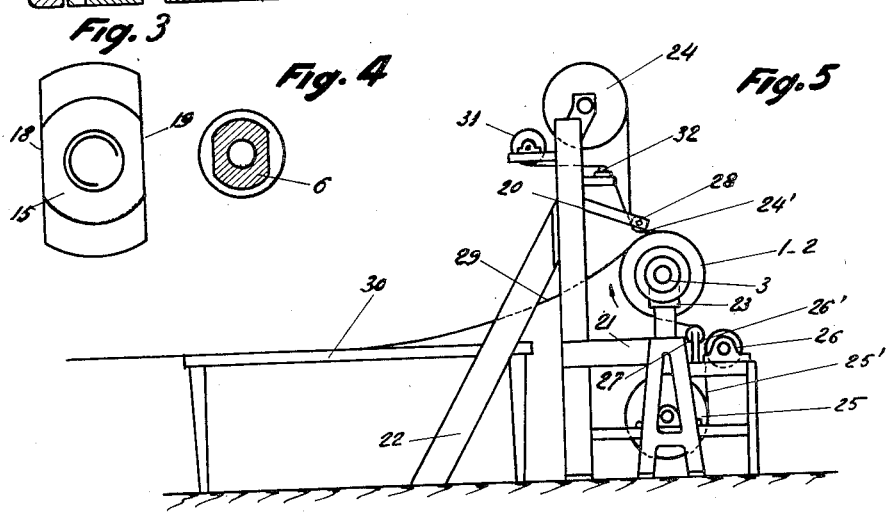
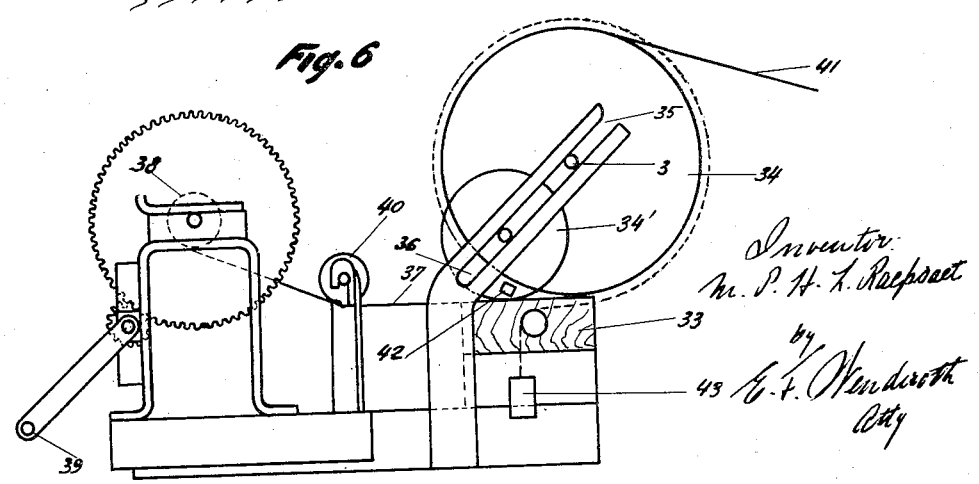

Patented Oct. 24, 1933

1,931,964

UNITED STATES PATENT OFFICE 1,931,964

PROCESS FOR THE MANUFACTURE OF BANDS OF CELLULAR RUBBER WITH CLOSED CELLS

Maurice Paul Henri Léon Raepsaet, Aurec-Sur Loire (Haute Loire), France, assignor to Societe Belge Du Caoutchouc Mousse, Berchem-Ste-Agathe lez Bruxelles, Belgium, a corporation of Belgium Application August 24, 1931, Serial No. 559,106 and in Germany July 25, 1931

1 Claim. (Cl. 18—53)

The object of the invention hereinafter described is a process for the manufacture of bands of cellular rubber with closed cells (such bands being for example about 1 metre in width, 10 metres in length and 1 centimetre thick), and the apparatus necessary for manufacturing same.

It is known that the essential operation in the production of cellular rubber consists of vulcanization in an autoclave charged with gas under very high pressure, the crude mass being enclosed in a permeable mould permitting the transmission of the gases, but preventing the now cellular rubber from expanding when the pressure in the autoclave is allowed to diminish.

According to the process of the invention, the band of raw rubber, which is preferably dusted over with talc, is wound on a mandrel, between two layers of stout paper, and with a strong band of metal—steel, tinsel, etc. The metal band is to prevent and control the expansion of the rubber mass after the absorption of the gas, whilst the layers of paper protect the rubber from contact with the metal band, usually of copper, which would blacken it, owing to the formation of copper sulphide by reason of the sulphur contained in the vulcanizing agent of the rubber.

In order that the resulting roll may retain its shape, the band of tinsel is appreciably longer than the rubber band, and the layers of paper are wrapped round the roll for about ten additional turns, which are well cemented together. The whole is firmly secured in a rigid metallic envelope.

In short, it is essential that, when the normal pressure is restored, strong opposition should be presented to the expansion of the now cellular rubber, because, when released, this rubber swells up to about 5–15 times its original volume. When the rubber band has been unrolled with suitable precaution, it is immersed, for 5–60 minutes, in a bath having a temperature of 35° to 100° C., to allow the expansion to take place. Then, in order to "fix" the cellular rubber, if desired, that is to say, bring it into a condition in which it will no longer vary in the course of time, the vulcanizing must be continued according to the process devised, for that purpose, by the inventor, and described in application Serial No. 559,101, filed August 24th, 1931, entitled Process for the manufacture of cellular rubber and ebonite with closed cells.

The invention also comprises the apparatus for carrying out the process, and especially a mandrel, composed of two terminal cheek pieces (connected together by a solid or hollow shaft, and serving to carry the roll, with a two-part outer cover, the ends of which fit into circular grooves in the cheek pieces. In addition, there is a machine for winding, and another for unwinding, the roll.

A typical embodiment of the apparatus required for the manufacture of bands of cellular rubber is hereinafter described, and is illustrated in the accompanying drawing.

Figs. 1–4 relate to the receptacle, or roll mandrel, in which the rubber band is inserted for introduction into the autoclave.

Fig. 1 is a diametrical section of this member, considerably shortened by a break. Fig. 2 is a partial cross section of same. Fig. 3 is an end elevation of the nut which locks the mandrel, and Fig. 4 is a section, along AB of Fig. 1, through the end of the shaft where it passes through the cover plate.

Figure 5 refers to a machine for winding the different strips spirally;

Figure 6 shows a machine for unwinding the rubber strips after vulcanization.

The mandrel is a cylindrical receptacle, formed by two end plates 1 and 2, connected together by a thick steel shaft 3, which may be surrounded by a copper sheath 4.

By means of its threaded end 5, this shaft is screwed into the baseplate 1, and it passes through the cover 2 by way of a recess corresponding in cross-section in the flat-sided end of the shaft, as shewn at 6 in Fig. 4. The two halves 7 and 8, of the steel cylindrical shell, which may be fitted with red copper linings 9 and 10, fit between the two plates 1 and 2. Each of these halves, 8 for example, terminates in a rebate 11, chamfered on the outer side and engaging in a circular groove 12 provided near the periphery of the plates 1 and 2. The two halves 7, 8 of the shell are interlocked by means of gudgeons 13 (Fig. 2), which are integral with one half and fit into holes provided in the other. Each half of the shell is provided, at the ends, with one or more recesses 14, for the insertion of the flat part of a tool which, on being turned, enables the shell to be detached from the plate.

The mandrel is tightened up by means of a powerful nut 15, fitting on the threaded end 16 of the shaft 3, and bearing against the cover 2 by means of a broad shoulder 17, the head of the nut 15 is flattened at both sides, 18, 19 (Fig. 3) to facilitate turning.

The raw rubber band to be introduced into the high gas-pressure autoclave, is first wound on the shaft 3. For this purpose, it should be placed between two bands of paper, and wound in conjunction with a band of metal or tinsel, so as to separate the layers of rubber and maintain each of them exactly in its allotted space. When the winding of the rubber band—which, as stated, may be about 1 metre in width, and some 10 metres in length—is completed, several extra turns of the tinsel band and the layers of paper are wound over it, and when all the tinsel has been wound on, the winding of the layers of paper is continued for about ten more turns, which are cemented together in order to provide a very firm hold on the rubber band.

When the winding operation is finished, the half shells 7 and 8, which should exactly fit against the roll, are placed in position, and the locking nut 15 is screwed home.

As already mentioned, the outer surface of the shaft 3 and the inner surface of the shell members 7 and 8 may be provided with a covering of red copper, the purpose of which is to further and regularize the isothermal character of the operation. Contact between the sheet of rubber and this copper must, however be prevented, because the vulcanizing agent for the rubber contains sulphur, which would lead to the formation of black copper sulphide and stain the rubber, such stains being very difficult to eradicate. It is for this reason, and also to prevent contact with the sheet of tinsel (also copper), that the rubber sheet is provided with a layer of paper on both sides. The object of this paper is also to hold the roll tightly—by means of the cemented extra turns—when the mandrel is opened on removal from the autoclave, at which time the now cellular rubber tends to expand considerably.

For the purpose of winding the rubber band and also the bands of paper and tinsel on the shaft of the mandrel, under uniform tension and without creasing the paper, the machine represented, as a diagrammatical elevation in Figure 5, has been devised.

A frame composed of uprights 20, a table 21 and struts 22 carries bearings 23, which support the shaft 3 of the mandrel, provided with the two cheek pieces 1 and 2. Above and below, the frame carries two reels of paper 24, 25, and it also carries a reel 26 on which is wound the band of tinsel. The winding operation is performed by first applying to the mandrel shaft 3 the tinsel band 26', the lower paper band 25', and the upper paper band 24', which, by means of the return rollers 27, 28, are fed to the shaft in the positions shewn in Fig. 5. The rubber band 29 is inserted between the paper bands 24', 25', either by spreading it out beforehand on a long table 30 placed in front of the machine, or by winding it on a roller 31 mounted on the frame of the machine, and from which it is led to the mandrel over the return rollers 32, 28, so as to enter between the two paper bands 24', 25'. In order to prevent any creasing of the sheet of rubber and the sheets of paper, it is usually necessary for the operatives to stay in front of the mandrel through the winding operation, in order to smooth the rubber and paper with their hands as winding progresses. The approximately vertical disposition of the various rollers in this winding machine has been specially adopted in order to facilitate the task of the operatives.

When after the high pressure set up in the autoclave during the vulcanizing process has been reduced to the normal atmospheric pressure, the mandrel is taken out of the autoclave, the now cellular rubber tends to swell up considerably. This is why serious precautions have to be taken to prevent the bands of rubber and tinfoil from unwinding suddenly—which might give rise to accidents—when the mandrel is opened. It is for this purpose that the unwinding machine shewn in Fig. 6 has been devised.

This machine consists substantially of a table 33, on which the mandrel 34 to be unwound is placed, by inserting its shaft 3 in an oblique groove 35—36, after removing the cheek pieces and shell members. In this condition the roll 34 remains firmly retained by the extra turns of the tinsel band and the firmly cemented layers of paper. The layers of paper are cut open, and the tinsel band 37 is led to a winding cylinder 38, actuated by a crank 39, by passing the band under a return roller 40. When a tractive effort is applied to the tinsel band 37, the result is to draw the shaft 3 down in a slide 35—36, and consequently to press the roll 34 tightly against the table 33—on which its weight already causes it to bear firmly—, thus producing a powerful braking action during the unwinding. This action may be increased by attaching weights to the ends of the mandrel shaft 3, or by means of a band brake, attached to a fixed point 42 and kept taut by a weight 43. When in unwinding the bands of paper and tinsel, the rubber band comes in sight, it is guided in the direction indicated by 41, and the unwinding is continued until completed. The machine serves equally for a large roll, as indicated by 34, or a small one, 34'.

What is claimed is:—

In the manufacture of cellular rubber bands having closed cells by the method of vulcanizing the crude blanks enclosed in molds which are not tight, at the interior of an autoclave filled with gas under high pressure, comprising winding the crude rubber strip between two strips of paper and a strip of metal, winding several additional turns of said metal strip and the paper strips after the end of the winding of said rubber band, winding several additional turns of the two said paper strips after the end of the winding of said metal strip, then cementing said additional turns of said paper strips, then enclosing the roll thus formed in a receptacle of strongly connected metallic members, and while restraining the roll from expanding, introducing the whole into the autoclave.

MAURICE PAUL HENRI LÉON RAEPSAET.